(12) United States Patent
Uchino

(10) Patent No.: US 7,799,214 B2
(45) Date of Patent: Sep. 21, 2010

(54) FILTRATION DEVICE FOR SURFACE TREATMENT LIQUID

(75) Inventor: Masahide Uchino, Tokyo (JP)

(73) Assignee: Japan Field Co., Ltd., Tokyo (JP)

( * ) Notice: Subject to any disclaimer, the term of this patent is extended or adjusted under 35 U.S.C. 154(b) by 526 days.

(21) Appl. No.: 11/793,242

(22) PCT Filed: Oct. 20, 2005

(86) PCT No.: PCT/JP2005/019326

§ 371 (c)(1),
(2), (4) Date: Jul. 9, 2007

(87) PCT Pub. No.: WO2006/064609

PCT Pub. Date: Jun. 22, 2006

(65) Prior Publication Data

US 2008/0217223 A1    Sep. 11, 2008

(30) Foreign Application Priority Data

Dec. 17, 2004    (JP) .............................. 2004-365301

(51) Int. Cl.
B01D 21/24    (2006.01)
(52) U.S. Cl. ....................... 210/134; 118/429; 134/109; 210/167.01; 210/167.31; 210/257.1; 210/259; 210/513
(58) Field of Classification Search ................. 210/110, 210/134, 137, 258, 259, 406, 416.1, 513, 210/167.01, 257.1, 167.31, 194, 195.1; 134/10, 134/109–111; 137/571, 572; 451/36, 60, 451/446; 118/429

See application file for complete search history.

(56) References Cited

U.S. PATENT DOCUMENTS 3,929,411 A * 12/1975 Takano et al. ............... 436/180

(Continued)

FOREIGN PATENT DOCUMENTS

JP    2001-314828    11/2001

(Continued)

*Primary Examiner*—Joseph W Drodge
(74) *Attorney, Agent, or Firm*—Jordan and Hamburg LLP

(57) ABSTRACT

A filtration device for a surface treatment liquid, in which deposited precipitates can be quickly transferred regardless of the magnitude of the diameter, material, and the like, of particles contained in a used surface treatment liquid. Further, the precipitates are not influenced by the flow caused by the transfer, so that such a situation that the deposited precipitates rise to flow into a surface treatment tank can be prevented. The filtration device for a surface treatment liquid comprises a surface treatment tank in which the surface of an object is treated by a surface treatment liquid; a pool tank connected to a pressure reduction mechanism and communicated with the surface treatment tank through interconnection control valve, in which the pool tank, when its communication with the surface treatment tank is interrupted by the closure of the interconnection control valve after the internal pressure is reduced to a predetermined level by the pressure reduction mechanism, performing in the surface treatment tank surface treatment of the object by utilizing negative pressure to collect and receive the contaminated surface treatment liquid; and a participates liquefaction tank that communicates with the lower end of the pool tank through a communication pipe provided with an open/close valve and into which the participates in the pool tank is introduced.

4 Claims, 2 Drawing Sheets

U.S. PATENT DOCUMENTS 5,510,018 A * 4/1996 Rey .......................... 210/97
6,461,524 B1 * 10/2002 Tsuihiji et al. .............. 210/777
6,824,620 B2 * 11/2004 Gray et al. ..................... 134/1
7,175,757 B2 * 2/2007 Hamada et al. ............... 210/97

FOREIGN PATENT DOCUMENTS

| | | |
|---|---|---|
| JP | 2002-79012 | 3/2002 |
| JP | 2002-95764 | 4/2002 |

* cited by examiner

FILTRATION DEVICE FOR SURFACE TREATMENT LIQUID

BACKGROUND OF THE INVENTION

This invention relates to a filtration device for removing precipitable precipitates from liquids such as, e.g., a cleaning liquid used for cleaning an article, a plating liquid, a surface treatment liquid used for cutting, rolling, or the like, a surface treatment liquid used for surface treatment process, and other used surface treatment liquids.

In a conventional filtration method of such liquids as mentioned above, precipitable precipitates are precipitated over a prescribed time in a surface treatment tank in which a surface of an article has been treated and in which a used surface treatment liquid is contained, and a supernatant liquid is recycled.

In another method, a used surface treatment liquid is conveyed by a pump to a precipitation tank arranged separately from the surface treatment tank, the precipitates are precipitated, and the supernatant liquid is recycled.

In another method, the used surface treatment liquid is filtered with a filter material to be recycled.

SUMMARY OF THE INVENTION

The method of precipitating the precipitable precipitates over a prescribed time in the surface treatment tank to recycle the supernatant liquid, however, occupies the surface treatment tank while the precipitates are precipitated therein, which results in an inefficient procedure, and has a drawback of requiring much time and expense for a removal process of removing the precipitated precipitates from the surface treatment tank prior to the subsequent use.

In the method of having a pump convey the surface treatment liquid to the precipitation tank arranged separately from the surface treatment tank to have the precipitates precipitated and recycle the supernatant liquid, usable pumps are limited depending on the pump's resistance against liquid, chemical resistance, heat resistance, and the like because the pump is used for conveying the used surface treatment liquid, and thereby, the used surface treatment liquid that can be filtered is often limited. In addition, the pump may be damaged or fail to pneumatically transport the liquid depending on the magnitude of the diameter, material, and the like of particles contained in the used surface treatment liquid, and it is difficult to rapidly convey the used surface treatment liquid with the pump because the ability of the pump determines the amount of flow.

The method of having the liquid filtered by the filter material to recycle the used surface treatment liquid tends to clog the filter material, thereby requiring frequent replacement of the filter material and resulting in a troublesome as well as uneconomical method.

This invention is made to solve such problems, and uses a reduced pressure instead of a pump to rapidly convey the surface treatment liquid in the surface treatment tank to a pool tank, and it is an object of this invention to enable rapid conveying of even accumulated precipitates regardless of the magnitude of the diameter, material, and the like of the particles contained in the used surface treatment liquid. In addition, cuttings, metal powder, and others mixed in the conveyed surface treatment liquid are made to precipitate and sink in a separately arranged precipitation tank, and by closing a switch valve to obstruct communication between the precipitation tank and the pool tank, the precipitates are prevented from being affected by a flow caused by the conveyance of the surface treatment liquid, so that only the surface treatment liquid having been processed is enabled to flow into the surface treatment tank.

To solve such problems as described above, a filtration device for a surface treatment liquid comprises a surface treatment tank in which the surface of an article is treated by the surface treatment liquid, a pool tank connected to a pressure reduction mechanism and communicated with the surface treatment tank through a communication control valve wherein after the pressure reduction mechanism reduces the pressure within the pool tank to a predetermined reduced pressure level while the communication control valve is closed to obstruct communication with the surface treatment tank, the communication control valve is opened to enable the pool tank to use a negative pressure to recover and contain the contaminated surface treatment liquid that has treated the surface of the article in the surface treatment tank, and a precipitation tank in communication with a lower end of the pool tank through a communication pipe arranged with a switch valve wherein the precipitates in the pool tank is introduced into the precipitation tank.

Furthermore, the mechanism for filling the pool tank with a pressurized gas may be connected to the pool tank.

Furthermore, the pool tank and the surface treatment tank may be connected by a conveying tube capable of conveying the surface treatment liquid in both directions between the pool tank and the surface treatment tank.

Furthermore, the pool tank and the surface treatment tank may be connected by a return tube for conveying the surface treatment liquid from the pool tank to the surface treatment tank, and connected by a conveying tube for conveying the surface treatment liquid from the surface treatment tank to the pool tank.

Furthermore, a cleanup mechanism for cleaning the surface treatment liquid may be arranged in the return tube.

The filtration device according to the present invention structured as described above uses a negative pressure to rapidly convey the used surface treatment liquid to the pool tank where communication is provided between the surface treatment tank and the pool tank after the pressure reduction mechanism reduces the pressure within the pool tank to a specific degree. The filtration device can rapidly and quickly convey the used surface treatment liquid in the surface treatment tank in response to a degree of the reduced pressure within the pool tank because a pump is not used, thus not being limited by chemical resistance, heat resistance, and the like of the pump that would perform such a process. The filtration device can rapidly perform the filtration process regardless of the magnitude of the diameter, material, and the like of particles included in the used surface treatment liquid. The filtration device can rapidly introduce the precipitate accumulated on the bottom of the surface treatment tank into a filtration means together with the used surface treatment liquid, that is, the filtration device enables the introduction of the accumulated precipitate, which used to be difficult to accomplish in a filtration using a pump.

The precipitate such as, e.g., cuttings, metal powder, and others, mixed in the used surface treatment liquid precipitates into the precipitation liquefaction tank through the communication pipe where the switch valve is opened to provide communication between the pool tank and the precipitation liquefaction tank. Where the surface treatment liquid is returned back to the surface treatment tank from the pool tank, the switch valve capable of obstructing communication between the precipitation liquefaction tank and the pool tank prevents the precipitate precipitated in the precipitation liquefaction tank from being affected by the flow caused by this return and obviates a situation such that the precipitated precipitate floats up to flow into the surface treatment tank.

Although the precipitate may be removed as it is, the switch valve can be opened with the precipitate being accumulated in the precipitation liquefaction tank after the surface treatment liquid is discharged as much as possible, and the pressure reduction mechanism can be activated to form a negative pressure within the precipitation liquefaction tank via the pool tank, so that the used surface treatment liquid attached to the precipitate in the precipitation liquefaction tank is volatilized and sucked toward the pressure reduction mechanism because of the boiling point lowered by the reduced pressure, and thus the precipitate in the precipitation liquefaction tank can be dried. The precipitate thus dried and taken out of the interior of the precipitation liquefaction tank can be free from the attached liquid and has a low impact on the environment, and such a drying process is extremely easy.

EXPLANATION OF REFERENCE NUMERALS

1: Surface Treatment Tank;
2: Conveying tube;
4: Pool Tank;
5: Surface Treatment Liquid;
6: Pressure Reduction Mechanism;
8: Switch Valve;
10: Communication Pipe;
11: Precipitation Liquefaction Tank;
13: Precipitate;
14: Return Pipe; and
15: Cleanup Mechanism.

FIRST EMBODIMENT

Figure 1:
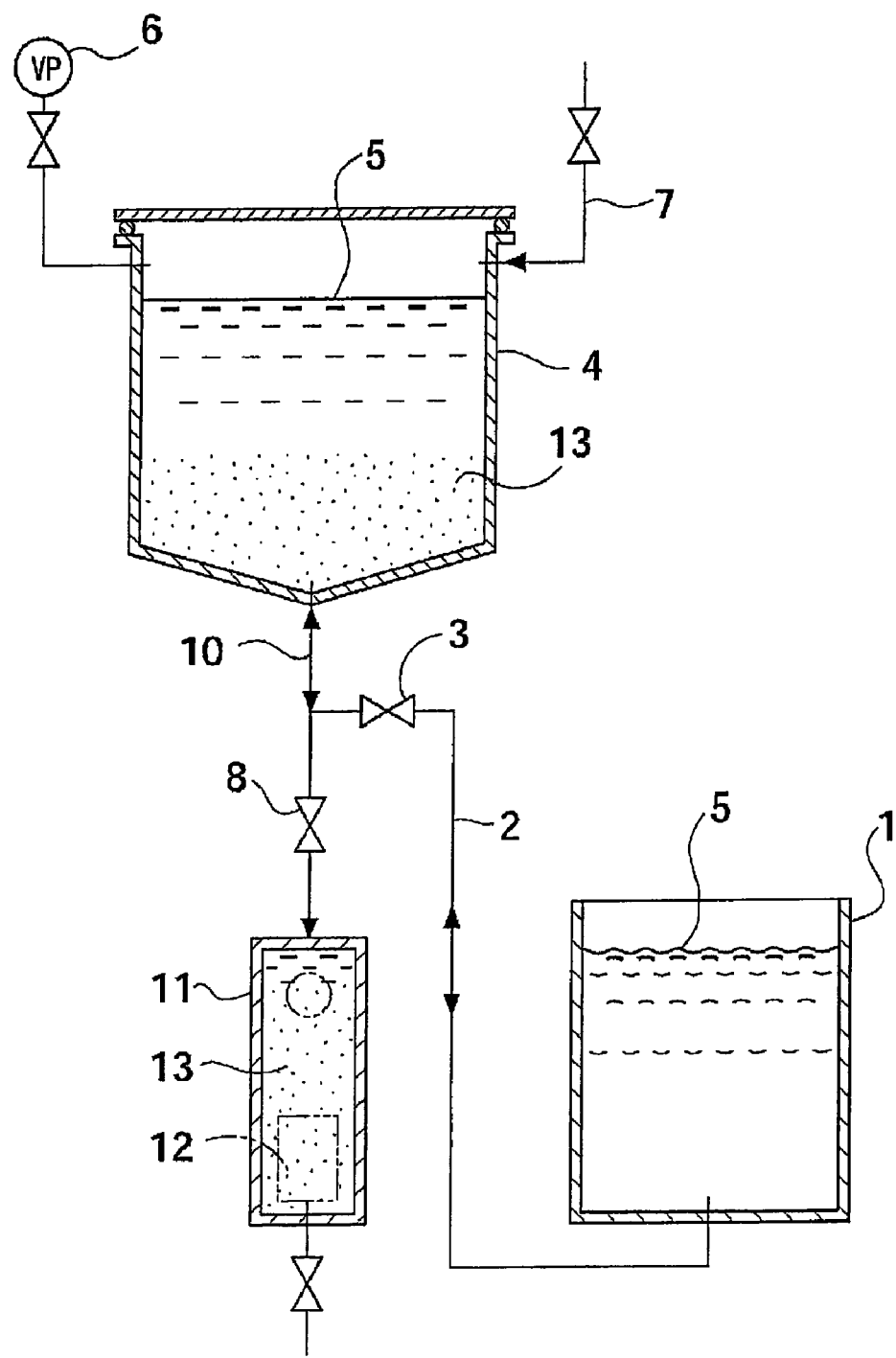
FIG. 1 is a cross section showing a filtration device according to a first embodiment of this invention.
Figure 2:
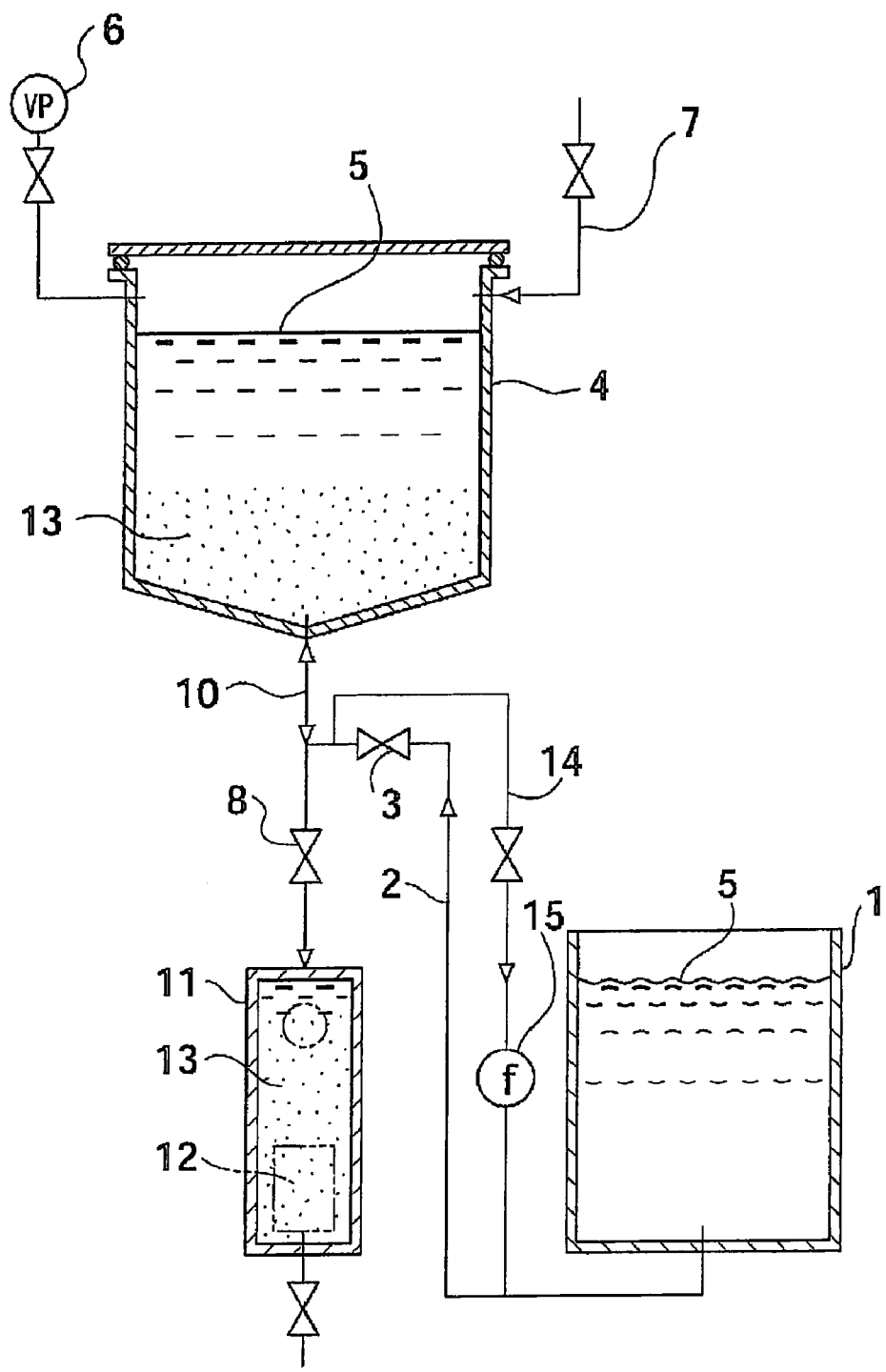
FIG. 2 is a cross section showing a filtration device according to a second embodiment of this invention.

The first embodiment according to this invention is hereinafter described with reference to FIG. 1. A surface treatment tank (1) contains a liquid used for an arbitrary industrial process, such as, e.g., a cleaning liquid used for cleaning an article, a plating liquid, a surface treatment liquid (5) used for cutting, rolling, or the like, and the surface treatment liquid (5) used for a surface treatment process, and a surface of an article is treated in the surface treatment tank (1).

A pool tank (4) is connected to the surface treatment tank (1) through a conveying tube and a communication control valve (3), and the pool tank (4) can recover and contain the surface treatment liquid (5) having treated the surface of the article in the surface treatment tank (1) and having become contaminated. The pool tank (4) is connected to a pressure reduction mechanism (6) such as, e.g., a vacuum pump, so that the pressure within the tank can be reduced. The pool tank (4) is connected to a pressurization pipe (7) connected to a mechanism, not shown, for filling the pool tank (4) with pressurized gas to enable the introduction of the pressurized gas into the interior of the pool tank (4).

A precipitation liquefaction tank (11), in communication with the pool tank (4) through a communicating pipe (10) having a switch valve (8), for introducing a precipitate (13) in the pool tank (4) into the precipitation liquefaction tank (11) is connected to the lower end of the pool tank (4). The precipitation liquefaction tank (11) is always filled with the surface treatment liquid (5) during the precipitation operation to enable the introduction of the precipitate (13) from the pool tank (4). A discharging opening (12) for the precipitate (13) is formed on the precipitation liquefaction tank (11).

In order to have a device structured as above perform filtration of the surface treatment liquid (5) such as, e.g., a surface treatment liquid having been used for cleaning work, plating work, and other surface treatment work, and a cutting oil used for cutting work of metal material, the communication control valve (3) and the switch valve (8) are closed, and then the pressure within the pool tank (4) is reduced by the pressure reduction mechanism (6). The pressure is preferably reduced to approximately 1 kPa to 30 kPa. With the pool tank (4) under the reduced pressure, the communication control valve (3) is subsequently opened to provide communication between the surface treatment tank (1) and the pool tank (4), so that the used surface treatment liquid (5) is rapidly conveyed to the pool tank (4) because the pool tank (4) is under a negative pressure. The used surface treatment liquid (5) in the surface treatment tank (1) can be rapidly and quickly conveyed in response to a degree of the reduced pressure of the pool tank (4) because this conveying does not use a pump.

This conveying that does not use a pump is not limited by chemical resistance, heat resistance, and the like of the pump that would perform the process. The used surface treatment liquid (5) can be conveyed to the pool tank (4) to be subjected to the filtration process rapidly regardless of the magnitude of the diameter, material, and the like of particles included in the used surface treatment liquid (5). The precipitate (13) accumulated on the bottom of the surface treatment tank (1) is rapidly introduced into the pool tank (4) together with the used surface treatment liquid (5), and the accumulated precipitate (13) can be thus introduced into the pool tank (4), which used to be difficult to accomplish in a procedure using a pump.

Subsequently, the switch valve (8) is opened to provide communication between the pool tank (4) and the precipitation liquefaction tank (11), so that the precipitate (13) such as, e.g., cuttings, metal powder, and others mixed in the used surface treatment liquid (5) introduced into the pool tank (4) precipitates into the precipitation liquefaction tank (11) through the communication pipe (10). When a certain period of time passes and the precipitate (13) has been precipitated into the precipitation liquefaction tank (11), there should no longer be the precipitate (13) in the pool tank (4), or only a small amount exists therein even if it does exist. In this state, after the switch valve (8) is closed to obstruct communication between the pool tank (4) and the precipitation liquefaction tank (11), the surface treatment liquid (5) is returned back to the surface treatment tank (1) to become reusable.

Where the surface treatment liquid (5) is returned back to the surface treatment tank (1) from the pool tank (4), the switch valve (8) capable of obstructing communication between the pool tank (4) and the precipitation liquefaction tank (11) prevents the flow caused by this return from exerting influence on the precipitated precipitate (13) in the precipitation liquefaction tank (11) and prevents a situation such as, e.g., the precipitated precipitate (13) floating up to flow into the pool tank (4) and the surface treatment tank (1).

As described above, the used surface treatment liquid (5) is introduced into the pool tank (4) to cause the precipitate (13) to accumulate in the precipitation liquefaction tank (11), and where the amount of accumulation is increased, the precipitate (13) may be removed as it is. However, if the untreated precipitate (13) is removed, the precipitate (13) is disposed of with the used surface treatment liquid (5) attached thereto, such as, e.g., cleaning solvent, cutting oil, plating liquid, and the like, and an impact on the environment is undesirably great.

After discharging the surface treatment liquid (5) as much as possible, the precipitate (13) having the used surface treatment liquid (5) attached thereto in the precipitation liquefaction tank (11) is dried by opening the switch valve (8) with the precipitate (13) being accumulated in the precipitation liquefaction tank (11) and activating the pressure reduction mechanism (6) to form a negative pressure in the precipitation liquefaction tank (11) via the pool tank (4), so that the used surface treatment liquid (5) attached to the precipitate (13) in the precipitation liquefaction tank (11) is volatilized and sucked toward the pressure reduction mechanism (6) due to the boiling point being lowered by the reduced pressure. Therefore, the precipitate (13) taken out of the interior of the precipitation liquefaction tank (11) can be free from the attached liquid and has a low impact on the environment, and such a process is extremely easy. The volatilized used surface treatment liquid (5) is condensed and reused. Where an appropriate heating mechanism, not shown, is arranged in the precipitation liquefaction tank (11) to heat the precipitate (13), the heating mechanism can accelerate the volatilization of the used surface treatment liquid (5), caused by the boiling point lowered by the reduced pressure, as well as reliably enabling the volatilization even at a low temperature, thus being preferable.

If a mechanism to fill the pool tank (4) with a pressurized gas is connected to the pool tank (4), the surface treatment liquid (5) having been subjected to the precipitation and filtration can be rapidly conveyed to the surface treatment tank (1) by the introduction of the pressurized gas into the pool tank (4) where the surface treatment liquid (5) having been subjected to the precipitation and filtration is conveyed.

SECOND EMBODIMENT

In the above embodiment, the surface treatment liquid (5) is filtered only by precipitating in the precipitation liquefaction tank (11) the precipitate (13) in the used surface treatment liquid (5). In the second embodiment, which is different from the above, for the purpose of a finer filtration, a return tube (14) for conveying the surface treatment liquid (5) from the pool tank (4) to the surface treatment tank (1) is arranged separately from the conveying tube (2) for conveying the surface treatment liquid (5) from the surface treatment tank (1) to the pool tank (4), and a cleanup mechanism (14) such as, e.g., a filter is arranged in the return tube (14) to filter the returning surface treatment liquid (5), so that the filtration of the returning surface treatment liquid (5) can be enhanced.

The invention claimed is:

1. A device for removing a precipitate present in a surface treatment liquid comprising:

a surface treatment tank in which the surface of an article is treated by the surface treatment liquid;

a pool tank connected to a pressure reduction mechanism and communicated with the surface treatment tank through a communication control valve, wherein after the pressure reduction mechanism reduces the pressure within the pool tank to a predetermined level of the reduced pressure while the communication control valve is closed to obstruct communication with the surface treatment tank, the communication control valve is opened to allow the pool tank to use a negative pressure to recover and contain the contaminated surface treatment liquid that has treated the surface of the article in the surface treatment tank; and a precipitation tank in communication with a lower end of the pool tank through a communication pipe arranged with a switch valve, wherein the precipitate in the pool tank, after said precipitate in said pool tank subsides, is introduced into the precipitation tank, wherein the pool tank and the surface treatment tank are connected by a return tube for conveying the surface treatment liquid from the pool tank to the surface treatment tank and by a conveying tube for conveying the surface treatment liquid from the surface treatment tank to the pool tank, the tubes arranged in parallel between the communication pipe and the surface treatment tank.

2. The device according to claim 1, wherein a mechanism for filling the pool tank with pressurized gas is connected to the pool tank.

3. The device according to claim 1 or 2, wherein the return tube connecting the pool tank and the surface treatment tank has a filter arranged therein.

4. The device according to claim 1, further comprising a cleanup mechanism for cleaning the surface treatment liquid which is arranged in the return tube.

* * * * *